United States
Jarvis

[11] 3,665,312
[45] May 23, 1972

[54] RADIO ALARM SYSTEM
[72] Inventor: Michael Jarvis, Livingston, N.J.
[73] Assignee: Paul Goldman, Livingston, N.J. a part interest
[22] Filed: Oct. 6, 1969
[21] Appl. No.: 864,077

[52] U.S. Cl.....................325/54, 325/55, 325/111, 325/113, 325/117, 340/52, 340/63, 340/224
[51] Int. Cl............................................H04b 1/00
[58] Field of Search.............325/51, 53, 54, 55, 111, 113, 325/117, 154, 166; 340/52, 63, 64, 224, 258 D; 343/5 PD, 6 A

[56] References Cited

UNITED STATES PATENTS

| | | | |
|---|---|---|---|
| 2,594,196 | 4/1952 | Moledzky | 340/63 |
| 2,640,193 | 5/1953 | Carter | 325/51 |
| 3,197,563 | 7/1965 | Hamsher et al. | 325/55 |
| 3,281,789 | 10/1966 | Willcox et al. | 325/53 |
| 3,461,423 | 8/1969 | Trumble | 340/63 |
| 3,474,460 | 10/1969 | Huebscher | 325/51 |
| 2,979,706 | 4/1961 | Simon et al. | 340/224 |

*Primary Examiner*—Benedict V. Safourek
*Assistant Examiner*—Albert J. Mayer
*Attorney*—Darby & Darby

[57] ABSTRACT

An alarm and monitoring system for a vehicle in which a transmitter is actuated upon illegal entry into or theft of the vehicle. The transmitter sends out a coded signal, which identifies the vehicle, sequentially on different frequencies with a predetermined and different time interval between each transmission. The received coded signals are used to located the vehicle by triangulation.

9 Claims, 5 Drawing Figures

Patented May 23, 1972

INVENTOR.
MICHAEL JARVIS

BY Darby & Darby

ATTORNEYS

INVENTOR.
MICHAEL JARVIS

BY Darby & Darby

ATTORNEYS

RADIO ALARM SYSTEM

This invention relates to monitoring systems and more particularly to a system for identifying and locating a vehicle upon the occurrence of a predetermined condition caused by illegal entry into the vehicle or by theft of the vehicle.

The problem of the theft or hijacking of vehicles such as trailer trucks, including cab and/or trailer unit, and their cargos has reached critical proportions. In general, it can be stated that the losses due to the hijacking of such vehicles and their cargos amount to many hundreds of million dollars in a given year. As should be apparent, it is highly desirable to provide an alarm system to notify the appropriate authorities when a truck has been stolen or hijacked. If possible, this should be done rapidly and the authorities should also be made aware of the location of the vehicle so that the cargo can be recovered. The latter is particularly important since many cargos are quite valuable, if not irreplaceable.

The present invention relates to a system to be used for both surveillance and location monitoring of vehicles such as trailer trucks which has the capability of alerting the proper authorities upon forced or illegal entry into or theft of such a vehicle. In accordance with the invention, a vehicle is equipped with an alarm system which operates upon the occurrence of a predetermined event, such as unauthorized entry, theft, etc., to produce and transmit a predetermined coded signal on a radio frequency carrier wave. The transmitter used in a vehicle is normally inoperative and is energized by an alarm control unit which is responsive to the breaking of an electrical circuit which can be caused, for example, by an intruder opening a door, uncoupling the cab from the trailer or any of a number of other predetermined conditions.

The coded signal is transmitted sequentially at different frequencies preferably with predetermined and different delays between the transmission of successive coded signals. This reduces the possibility of jamming or confusing the alarm system and also provides a more positive identification of the particular truck which has been hijacked. The transmitted coded signals are picked up by a plurality of direction finder type monitor stations, which can be either fixed or mobile. The information acquired by the monitor stations is relayed to a central computer station which determines the location of the hijacked vehicle by any suitable position locating technique such as triangulation.

The system of the present invention is capable of operation over a fairly wide range with a considerable degree of accuracy. Also, it can identify a number of vehicles and minimizes theft in a situation where the thieves would try to jam the surveillance system.

It is therefore an object of the present invention to provide a surveillance and location monitoring system for vehicles.

A further object is to provide a surveillance and monitoring system for a vehicle in which a transmitter is actuated to broadcast coded signals upon the occurrence of a certain event such as the unauthorized entry of a person into the vehicle.

A further object is to provide a surveillance and monitoring system for vehicles in which a transmitter is actuated upon illegal entry into the vehicle and a coded signal is sequentially transmitted at a plurality of different frequencies with predetermined time spacings therebetween.

An additional object is to provide a surveillance and monitoring system for a vehicle in which coded signals from a vehicle are received by a plurality of monitor stations which computes the location of the vehicle.

Other objects and advantages of the present invention will become more apparent upon reference to the following specification and annexed drawings in which.

Figure 1:
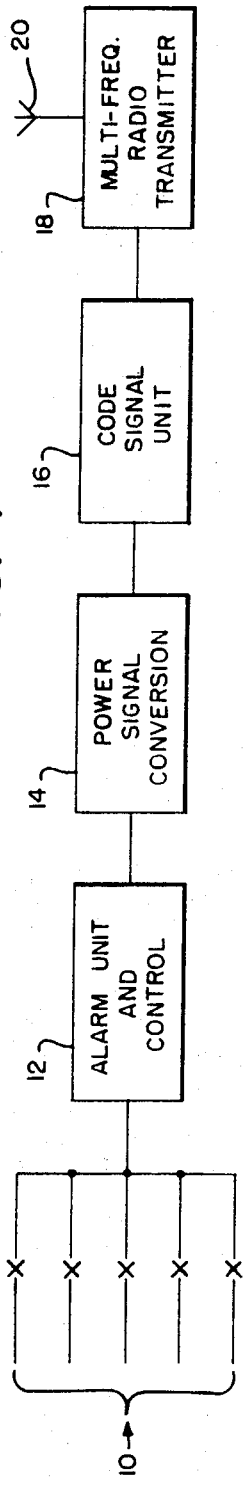
FIG. 1 is a schematic block diagram of the alarm and transmitter unit at each vehicle.

FIG. 1 shows the equipment which is located in a vehicle which is to operate in accordance with the system of the present invention. A number of circuit tripping devices 10 are provided to actuate a coder and transmitter, both of which are normally de-energized. The circuit tripping devices, several of which are described in greater detail below, are wired in parallel so that the actuation of any one thereof upon the occurrence of a predetermined event, such as illegal entry, disconnection of a trailer from the cab unit, cutting a hole into a panel wall, actuates the circuit tripping device.

The circuit tripping devices 10 are connected to an alarm and control unit 12 which produces a signal when any one of the devices 10 is actuated by the unauthorized event. This signal is supplied to a power signal conversion circuit 14 which, in response to the signal, supplies the necessary voltages to actuate a signal coder and a radio transmitter.

The signal coder 16 is any suitable unit for producing a digital code having a predetermined characteristic to identify a particular vehicle with which it is located. For example, it can be a digital coding device. One preferred form of such device is described in detail below. The coded signal is preferably produced on a sequential basis, so that the same coded signal can be transmitted at a plurality of different frequencies sequentially. It is also preferred that there be a predetermined, and different time delay between each transmission of a coded signal.

The coded signal from the unit 16 is broadcast by a multi-frequency radio transmitter 18 which is of conventional construction. As described below, transmitter 18 is designed to broadcast at three different frequencies and the signals are transmitted over an antenna 20.

Figure 2:
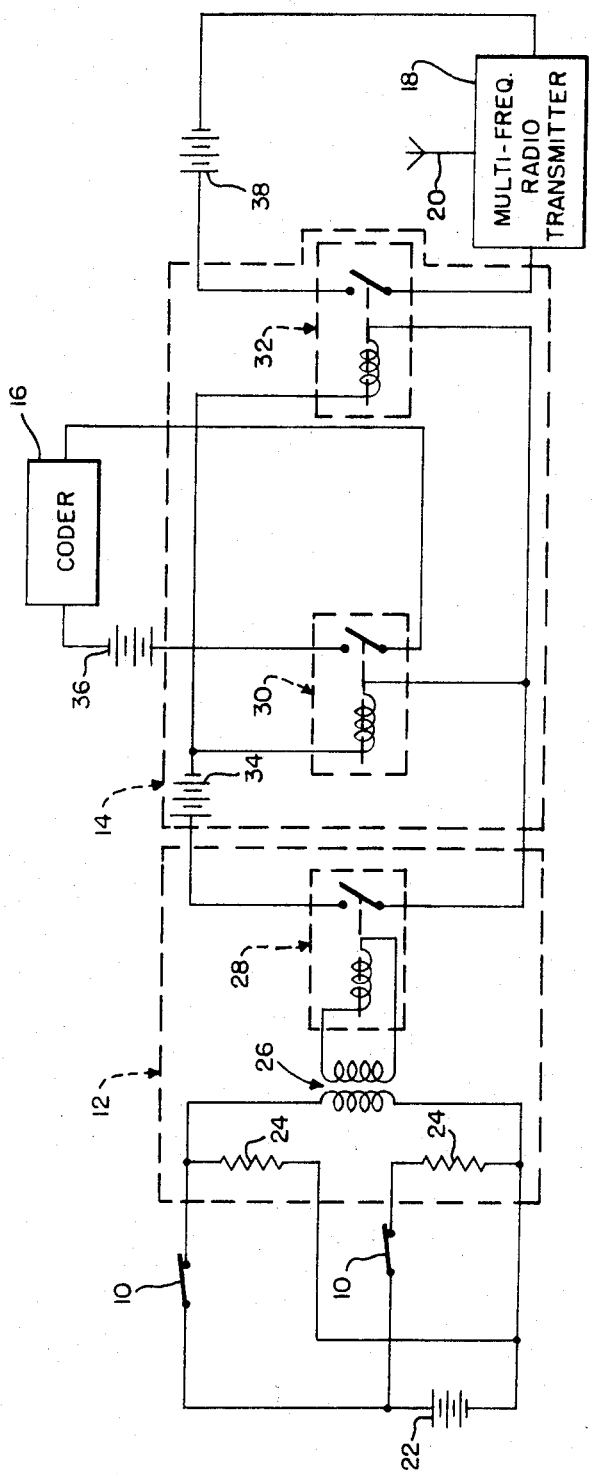
FIG. 2 is a schematic diagram of the constant current alarm control unit and power-signal conversion unit.

Considering now the operation of the system, reference is made to FIG. 2. Here, the circuit tripping device 10 is represented by a single pole switch, two of which are shown wired in parallel across a source of voltage, illustrated by a battery 22. The circuit tripping devices 10 are normally closed so that a constant current flows through and a constant voltage drop is produced across a respective resistor 24 which is connected in series with the battery 22 and a circuit tripper 10. The primary winding of a coupling transformer 26 is also connected across each of the load resistors 24.

Upon actuation, or opening, of any one of the circuit tripping devices 10 the voltage drop across one of the respectively connected load resistors 24 changes to zero substantially instantaneously. This produces a change in the steady state flux in the primary winding of the transformer 26 causing a voltage to be induced into the secondary winding. The coil of a relay 28, which is of the self-latching type, is connected across the secondary winding. A voltage induced in the secondary of transformer 26 causes the relay 28 to operate and closed to normally open contacts. If desired, the relay 28 can have a manual re-set.

The arrangement for actuating relay 28 is only one of a number of systems which can be used. For example, relay 28 can be a relay which has normally closed contacts. The circuit tripping devices are wired in series with the coil of the relay. When the system is on and the tripping devices 10 are not actuated, current will flow through the relay coil holding its contacts open. When a device 10 is tripped, the circuit will open, causing the relay contacts to close to supply power to the coder and transmitter.

Upon closing of the contacts of relay 28, the coils of the two other relays 30 and 32 are energized by a voltage from a battery 34 which is connected in series with each of these coils. Energization of the two relays 30 and 32 causes their normally open contacts to close to apply respective voltages from batteries or other suitable DC sources 36 and 38 to operate the coder unit 16 and the transmitter unit 18. The batteries 36 and 38 are respectively connected in series with the contacts of relays 30 and 32 and the coder and transmitter units 16 and 18. If desired, only a single relay with one or two sets of contacts can be used instead of the two relays 30 and 32. In the former case of a single set of contacts, only a single battery 34 would be needed instead of the two batteries 36 and 38 which are shown. Also, if desired, the single battery 34 also can be used to apply the operating voltages to the coder and the transmitter 18 upon the closing of the normally open contacts of the relay 28.

While batteries 34, 36 and 38 have been shown, it should be understood that any suitable DC power supply source can be utilized. However, in general, it is preferred that batteries be used and that they be separate from the normal ignition battery of the vehicle and located at a safe place, preferably in a sealed box, so that they cannot be tampered with. The same holds true for the battery 22.

Figure 3:
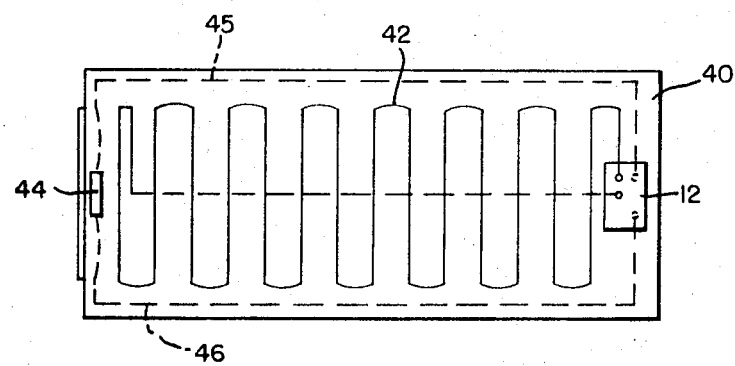
FIG. 3 is a diagram showing an alarm actuator wired into a wall panel of a truck.

Considering now the circuit tripping devices, one arrangement for these is shown in FIG. 3. Here, reference numeral 40 indicates one of the side panels of a trailer in which is wired a conductive tape 42 in a serpentine loop to form one of the devices 10. Another circuit tripping device is formed by a normally closed switch 44 on the door of the trailer. The door switch 44 is wired in series with a pair of conductors 45 and 46. In series with these two conductors can be, for example, a conductive tape loop, similar to that of 42, in the roof of the vehicle. In series with the conductor 46 can be either switches in the floor of the trailer or another conductive tape panel such as that shown in 42. As should be apparent, upon someone trying to force a hole into the side, top or bottom wall of the truck, the tape 42 will be broken, actuating the alarm unit in the manner described with respect to FIG. 2. The same holds true with respect to the opening of door. In normal use, a key lock or a digital lock-switch is provided to bypass the switch 44 so that the door can be opened by authorized personnel. This is not shown.

Other types of circuit tripping devices 10 can be utilized. For example, a conductive circuit can be provided between the cab and the trailer units so that if the two are separated, the alarm unit will be actuated. Switches can also be provided on the doors of the cab, the hood, etc. Each of these is to be actuated upon illegal entry or theft.

Figure 4:
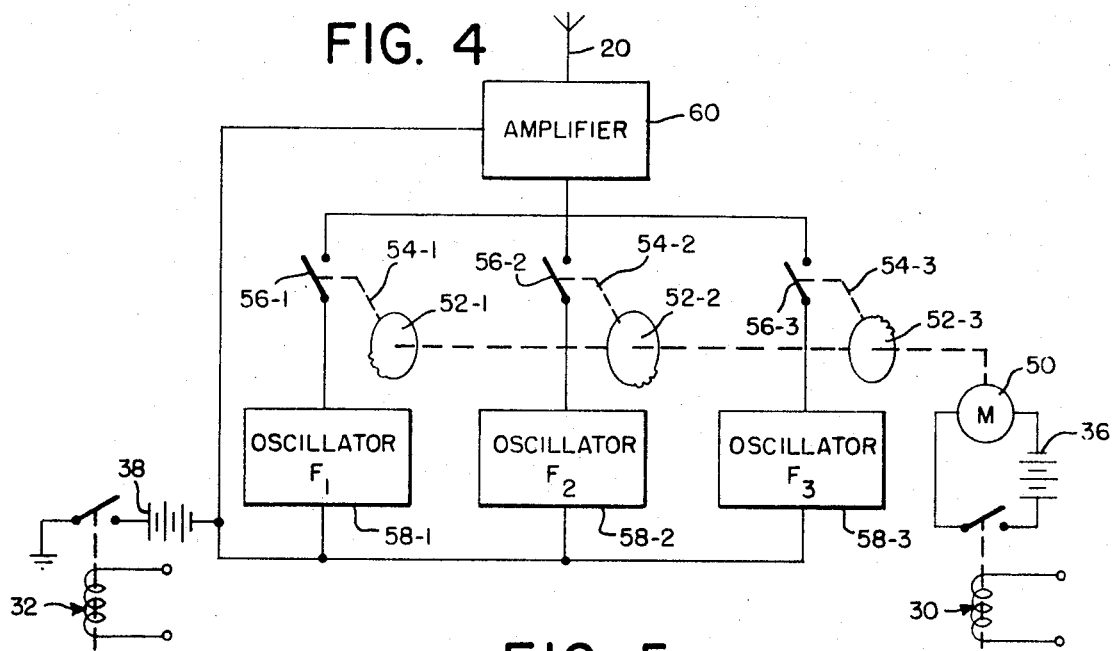
FIG. 4 is a schematic block diagram of the coder and transmitter.

FIG. 4 shows the coder 16 and the transmitter 18 in greater detail. Here, assume that the two relays 30 and 32 have been energized so that the components of the transmitter and the coder units are energized. The closing of the contacts of the relay 30 applies voltage from the battery 36 to a motor 50 which has on its shaft three lobed cams 52-1, 52-2 and 52-3. Each of the cams 52 has a cam follower 54 which controls a switch 56 in the output line of a respectively connected oscillator 58 in the transmitter. Each of the oscillators 58 produces a different frequency, which are designated $F_1$, $F_2$ and $F_3$. These oscillators are preferably crystal controlled. As the motor 50 rotates the three cams 52 are also rotated. Each of the cams has a number of cutouts thereon corresponding to the particular code to be transmitted to identify a given vehicle. For example, binary, BCD, Baudot, or other suitable conventional code can be used. While Morse code can be used, it is not preferred since it is more difficult to decode automatically.

The three cams 52 each have cutouts for the same coded signal but are turned with respect to each other by a predetermined amount so that only one cam will actuate a respective cam follower 54 at a given time. Also, there is a space between the active portions of the three cams, this space also preferably being different. Thus, there will be a pre-determined time, which is controllable by the orientation of the cams and is preferably different, during which there is no signal transmission. As is seen in FIG. 4, as the motor 50 rotates, the cam follower 54-1 riding on the cam 52-1 is actuated closing the switch 56-1 in accordance with the cutout pattern on the cam 52-1. The output signal from the oscillator 58-1 each time the switch 56-1 is closed is supplied to the power amplifier 60 of the transmitter and then broadcast from the antenna 20.

After the active surface portion of cam 52-1 has been traversed by the cam follower 54-1, there is a predetermined space when no signals are supplied to the power amplifier 60. After this time, the cam follower 56-2 rides on the active surface portion of the cam 52-2 to supply the signals at frequency $F_2$ of the same code to the power amplifier 60. Similarly, after the signals have been produced by the cam and cam follower 52-2 and 54-2, the active portion of the cam 52-3 is encountered by the respective cam follower 54-3 to supply signals of frequency $F_3$ to the power amplifier 60 for transmission.

Thus, as should be apparent, the same coded signal is transmitted at three separate frequencies by the transmitter unit with a predetermined spacing between each of the three signals. The use of three separate frequencies is advantageous since it makes it more difficult to jam the signals. Also, if signals of three fairly widely separated frequencies are used, then there is a greater chance that the signal will be received by a receiver at a monitoring station under a variety of atmospheric and environmental conditions. Also, if desired, the use of the three frequencies enables a determination to be made as to whether or not the signals being transmitted are true signals from a unit actually in a vehicle or are dummy signals which are being transmitted by someone seeking to deliberately confuse the system by sending signals from one place while actually stealing a vehicle from another place. As should be apparent, more than three frequencies can be used.

Instead of using the electromechanical encoder of FIG. 4, an all electronic encoder can be used. This would comprise a digital encoder for producing the coded signal upon actuation with suitable gating and delay circuits for gating open the three oscillator outputs to the power amplifier in the proper sequence and after the predetermined time delays.

The transmitters are designed in accordance with conventional practices. For example, the power amplifier 60 would have the circuits necessary to optimize the transmission of the various frequencies. Also, either AM or FM transmission can be used.

Figure 5:
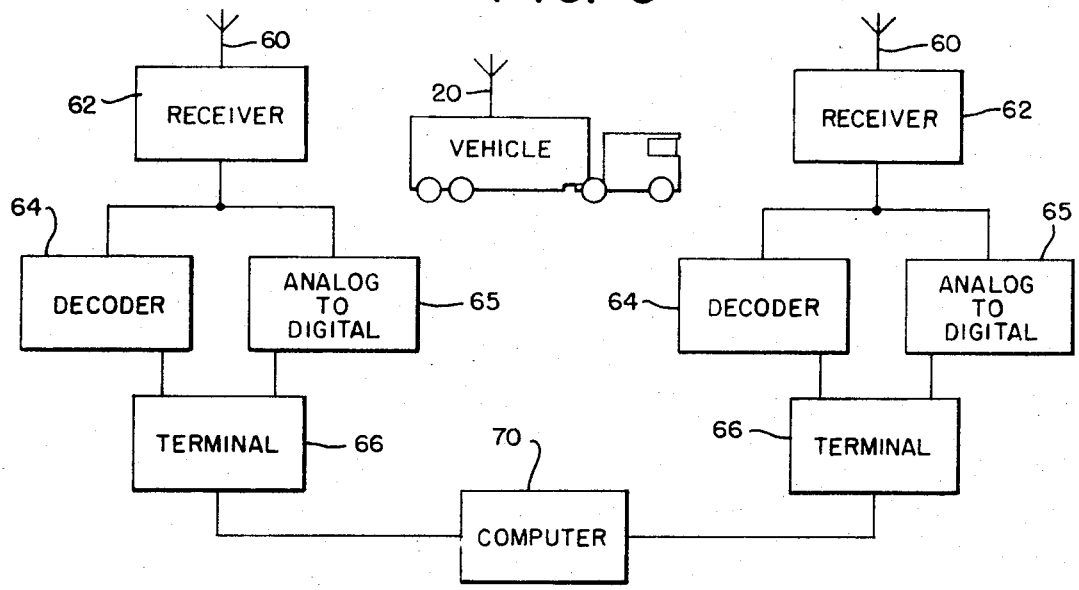
FIG. 5 is a schematic diagram of the monitoring system.

FIG. 5 shows the portion of the system for determining the identity and location of the vehicle at which the unauthorized event has taken place by a triangulation technique. Here, the vehicle is shown having the antenna 20 for transmitting the coded signals. When these signals are transmitted after the alarm has been actuated, they are received by two or more monitoring stations at spaced locations, each of which has similar equipment. This includes an antenna 60 which supplies the signals received to a radio frequency receiver 62. The receiver 62 has the capability of receiving all three assigned frequencies. It can be, for example, a frequency swept receiver, a frequency multiplexed receiver, or else three separate receivers tuned to the respective frequencies. The antenna 60 and the receiver 62 are preferably of the direction-finding type so that the azimuthal position of the vehicle broadcasting the signals are determined by conventional techniques at each station. This can be done, for example, by taking a voltage corresponding to the shaft position of the antenna at the angle where the vehicle transmitting signals is located. This voltage is preferably converted into digital code by an analog-to-digital converter 65.

The coded signals from the receiver 62 are applied to a decoder 64 so that only the information corresponding to the digital code is present at the output of the decoder. Both the outputs of the decoder 64 and the converter 65 are conveyed from a terminal 66 over a land line or over another radio frequency link to a computer 70 at a central processing station. It is preferred that the data processing be done at a central station since it is cheaper to rent the lines or provide a separate transmitter to send the information to the computer at the central station than to have a computer at each monitoring station.

The signals provided to the computer are analyzed and from the code the identity of a vehicle is determined. For example, a given digital code corresponds to a particular vehicle having a known license number and/or other identifying characteristics of a given truck owner. This information is stored in the computer.

The computer also uses the positional information from the direction finder receivers at two or more monitoring stations and either automatically performs, or prints out data to enable an operator to perform, a triangulation analysis to determine the position of the vehicle. This information as to the identity and position of the vehicle at which the alarm was actuated is relayed from the central computer station to suitable law enforcement authorities who are then in a position to commence surveillance and apprehension of the vehicle. It should be understood that the position of the vehicle, even though it can be constantly changing, will be continuously monitored by the computer and the central station can provide updated information to the law enforcement authorities on a continuous basis.

As should be apparent, the use of the plurality of different frequencies on which the coded signals are transmitted, gives rise to many uses. For example, if deliberately confusing signals are transmitted on only one or two of the three frequencies, these can be ignored or a special effort made to track down their source. Further, the decoder and/or computer can be made to act on coded signals appearing on less than the three frequencies. The use of three frequencies increases system reliability in accordance with the principles of redundancy. Also, identification codes for individual vehicles can be assigned and changed periodically as well as master codes which all vehicles can use as a prefix, suffix or interspersed with the identification code.

What is claimed is:

1. An alarm and surveillance system for vehicles for broadcasting signals upon occurrence of a predetermined condition, comprising
   a normally deenergized means for transmitting radio frequency energy,
   an antenna electrically coupled to the output of said transmitting means,
   at least one normally deenergized code generator means electrically coupled to the input of said transmitting means for supplying a coded signal to said transmitting means on a repetitive basis,
   and means coupled to said transmitting means and said code generator means for actuating the same upon the occurrence of a said predetermined condition, said actuating means comprising an impedance means, means for normally producing a current of a substantially constant value through said impedance means, means responsive to said predetermined occurrence for producing a current change through said impedance means, and means electrically coupled to said impedance means and responsive to said change of current to actuate said transmitting means and said code generator means.

2. The system of claim 1 wherein said code generator means for producing said coded signal operates to produce the coded signal with different time spacings between successive productions of the coded signal.

3. The system of claim 1 wherein said transmitting means includes means for producing a plurality of different carrier frequency signals, and means for successively transmitting the coded signal on different carrier frequencies.

4. The system of claim 3 wherein said code generator means for producing said coded signal operates to produce the coded signal with different time spacings between successive productions of the coded signal.

5. The system of claim 1 further comprising a plurality of receiver stations each having means for receiving signals from a vehicle and for determining the direction from which said signals were transmitted, each receiver including means for decoding the received signals to verify their source, a central station having computer means, and means for supplying data corresponding to the direction from which signals are received from the individual receiver stations to the computer means at said central station.

6. The system of claim 4 further comprising a plurality of receiver stations each having means for receiving signals from a vehicle and for determining the direction from which said signals were transmitted and means for decoding the received signals in response to frequency and spacing, a central station having computer means, and means for supplying data corresponding to the direction from which signals are received from the individual receiver stations to the computer means at said central station.

7. The system of claim 1 wherein said means for producing the current change comprises a circuit tripping means connected to said impedance means which opens at least a portion of the constant current circuit in response to said predetermined occurrence.

8. An alarm and surveillance system for vehicles for broadcasting signals upon occurrence of a predetermined condition, comprising
   a normally deenergized means for transmitting radio frequency energy,
   an antenna electrically coupled to the output of said transmitting means,
   at least one normally deenergized code generator means electrically coupled to the input of said transmitting means for supplying a coded signal to said transmitting means on a repetitive basis, said coded signal having different time spacings between successive productions thereof and said transmitting means including means for producing a plurality of different carrier frequency signals, and means for successively transmitting the coded signal on different carrier frequencies,
   and means coupled to said transmitting means and said code generator means for actuating the same upon the occurrence of a said predetermined condition, said actuating means comprising an impedance means, means for normally producing a current of a substantially constant value through said impedance means, means responsive to said predetermined occurrence for producing a current change through said impedance means, and means electrically coupled to said impedance means and responsive to said change of current to actuate said transmitting means and said code generator means.

9. The system of claim 8 wherein said means for producing the current change comprises a circuit tripping means connected to said impedance means which opens at least a portion of the constant current in response to said predetermined occurrence.

* * * * *